(No Model.)
E. F. PARKER.
ROPE HITCHING DEVICE.
No. 525,770. Patented Sept. 11, 1894.
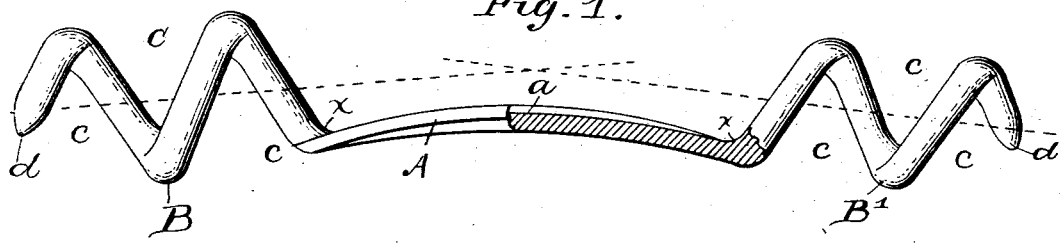
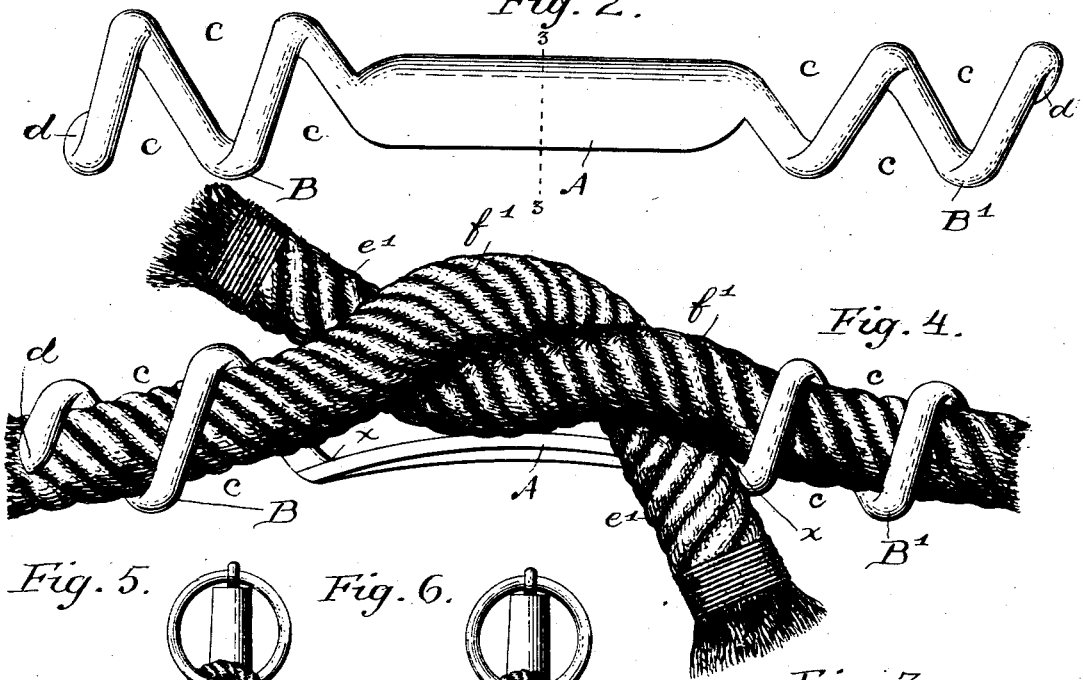
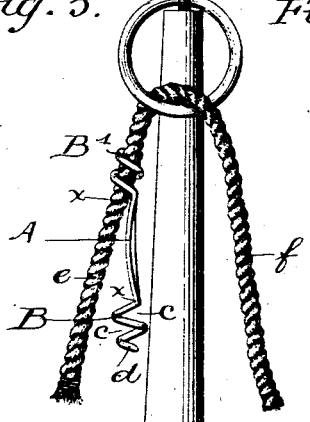
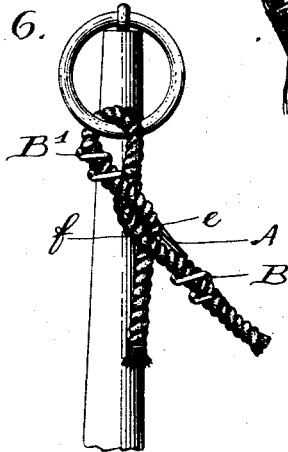
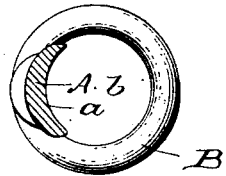
Witnesses:
Albert B. Blackwood
Carleton E. Snell
Inventor:
Edward F. Parker
by J. H. Soulé & Co.
Attorneys.

UNITED STATES PATENT OFFICE.

EDWARD F. PARKER, OF FAIRFIELD, MAINE.

ROPE-HITCHING DEVICE.

SPECIFICATION forming part of Letters Patent No. 525,770, dated September 11, 1894.

Application filed October 7, 1893. Serial No. 487,472. (No model.)

*To all whom it may concern:*

Be it known that I, EDWARD F. PARKER, a citizen of the United States, residing at Fairfield, in the county of Somerset and State of Maine, have invented certain new and useful Improvements in Hitching Attachments for Ropes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to devices applied to ropes for convenience in hitching the same, to a hitching-post for example; and the invention consists in a new and improved style of hitching attachment which is very simple and inexpensive, and which at the same time perfectly secures the rope and enables the hitching and unhitching to be accomplished with the greatest facility.

The improved hitch is equally adapted either to secure the end of a rope to a hitching-post (or other support) or to secure the two ends of a rope or the ends of two ropes together.

The drawings illustrate the improved rope-hitch and its manner of use. Figure 1, is a side view (partly in section) of the attachment by itself. Fig. 2, is a face view. Fig. 3, is a section on the line 3—3, Fig. 2. Fig. 4, is a side view showing two ends of rope secured together by the improved hitch. Figs. 5, and 6, illustrate the manner of securing the end of a rope to a hitching-post.

Describing first the construction of the device, the improved rope-hitch in its preferred form consists of a single piece of metal, such as iron, wrought into the shape shown in Figs. 1, and 2, and comprising, as shown, a central connecting-plate, and at each end of said plate a rope-sleeve formed by a projecting spiral.

The central plate A, is slightly curved or bent downwardly at its ends and is preferably also slightly bent upward at its side edges so that the upper surface $a$ of the plate is concave in cross-section (Fig. 3) and also slopes downward from its center toward its ends (see Fig. 1). The plate A, is widest at its center and tapers toward its ends (see Fig. 2) where it merges into the spirals B, B'. Each of the terminal spirals is given the same general direction as its adjacent end of plate A, so that the axes of the two spirals are not in line with each other but have the same angular divergence as the two ends of the plate, as shown in Fig. 1 by the dotted lines representing the extended axes of the spirals. The two spirals are convolved in opposite directions as shown. The convolutions of the spirals extend beyond the plane of plate A at one side only, that is, only in the direction of the face $a$ of the plate, and consequently each spiral is left with a clear interior passage $b$ (Fig. 3) above the face of the plate, the two passages $b$ having the relative directions indicated by the dotted lines in Fig. 1. Preferably one of the spirals (B') is a little more closely coiled and has a slightly less diameter than the other spiral B. The convolutions of each spiral are even and regular, so that the side space $c$ between the parallel bends of the spiral is of uniform width and the interior axial passage $b$ has a uniform diameter. Moreover the diameter of the passage $b$ of each spiral is equal to the width of the space $c$ between its convolutions. Each spiral has at least one complete convolution, and preferably has nearly two complete convolutions, as illustrated. The extremity $d$ of each spiral is preferably beveled or rounded as shown.

The spirals B, B', constitute rope-sleeves through which the rope extends when the device is in use. Since the spirals are made integral with their connecting-plate A, and since both are made of wrought-iron, the plate and the spirals are entirely rigid and relatively unyielding.

In Figs. 5, and 6, is indicated how the invention is employed for the purpose of securing a rope to a hitching-post. The hitching device is first attached at the free end $e$ of the rope which is passed through the hitching-ring as shown in Fig. 5, the rope extending through the rope-sleeve formed by the spiral B'. When the device has been thus attached to the rope it need not be detached again for any purpose (unless a new rope is to be substituted), but it can remain on the rope ready to be used at any time for hitching. To hitch the rope to the post, it is only necessary to engage the other sleeve formed by spiral B with the body f of the rope at the other side of the hitching-ring, which is done by passing the portion f of the rope laterally through the space c between the convolutions of the spiral, and twisting it around longitudinally into the interior passage b of the spiral. At the same time the free end e of the rope is turned in between the rope f and the plate A of the hitch, thus securing the rope to the hitching-ring in the manner shown in Fig. 6. Owing to the fact that the face of plate A is located at one side of the rope-passage b and in line with one wall thereof, the end e of the rope, which is tucked in between the plate A and the body f of the rope, forces the rope at the inner end of the spiral upwardly and out of the line of the passage b, so that strain upon the rope will not cause it to slide longitudinally but will only make the attachment more firm by tending to force the end portion e of the rope against plate A and into the angle x formed at the junction of the plate and spiral. This will be better understood by reference to Fig. 4, which shows a precisely similar manner of hitching two rope-ends together. In this case, the rope-sleeve formed by the spirals B, B', embrace the ropes a little distance back from their ends, and both ends of rope extend inwardly and cross above the plate A, being twisted in the manner shown in the figure. Each rope end e' passes beneath the other rope at f', and the ropes are held secure in the same way as already described with reference to Figs. 5, and 6. Each rope end e' should be pulled as close as possible to the base of its adjacent spiral, so that strain upon the ropes will only tend to wedge the ends e' more tightly into the angles x.

The bending of the plate A, which brings the spirals B, B', out of line with each other causes the turns of rope above the plate to bind together more firmly than would be the case if there were a direct pull from spiral to spiral. Manifestly the same effect would be produced if the plate A were bent laterally in the plane of its witdh, instead of being bent outward as shown, or if the plate were given a slight twist; or the plate might be straight and the spirals tipped back slightly by bending at their points of connection with the plate, the object in either case being to throw the axial rope-passages of the two spirals out of the same straight line so as to make the attachment more secure by preventing the ends of rope from slipping and being pulled out of their sleeves under any strain to which the rope may be subjected. The concavity of the upper surface a of plate A, permits a firmer contact between the rope and the plate.

The beveled points of the spirals prevent injury to the rope during the process of hitching or of unhitching.

The diameter of the rope sleeve formed by spiral B, is just sufficient to easily accommodate the rope, and as the side spaces c of the spiral are of the same width the rope can be readily turned into the sleeve. If the diameter of the other spiral B' is made slightly smaller, as already suggested, then the spiral B' will fit the rope more tightly and can be suspended therefrom as shown in Fig. 5 (permanently if desired) without danger of slipping off.

If the hitching device is to be permanently attached to the rope, some other kind of permanent securing clasp might be substituted for the spiral B', because the single spiral B would then be the only one required to facilitate hitching and unhitching. I prefer, however, to use both spirals, for they supply a very simple and convenient means of applying the device to any rope.

The primary advantage of the spiral form of rope-sleeve is that it supplies a longitudinal rope-passage into which the portion f of the rope can be readily introduced sidewise between the convolutions of the spiral. Some different form of sleeve having a free longitudinal passage with side openings communicating therewith and permitting the lateral introduction of the rope could be substituted for the spiral and would accomplish the purpose thereof. Any such modified form of rope-sleeve, possessing the useful characteristics of the spiral sleeve which I have particularly described and illustrated, would fall within the scope of my invention, though I prefer the spiral form as being the most satisfactory in all respects.

By the use of my improved rope-hitch a rope can be fastened very easily and quickly, and the hitching is perfectly secure. The rope can be unhitched with equal ease by twisting it out of the sleeve B. The quick rotary motion of the hand in engaging the rope with the spiral or disengaging it therefrom is so readily acquired that after a trial or two the rope can be hitched or unhitched in a second of time.

I claim as my invention—

1. A rope-hitch consisting of a plate, having at one end means for attachment to a rope, back of the end thereof and having at its other end a longitudinally extending rope sleeve which has a free longitudinal rope passage, above one face of the plate said rope sleeve being open at its side to permit a portion of rope to be introduced laterally into said rope passage, substantially as set forth.

2. A rope-hitch consisting of a plate A having at one end means for attachment to a rope, back of the end thereof and having at its other end a spiral B, said spiral having a free interior rope passage b extending longitudinally just above the face of the plate, and the lateral space between the convolutions of said spiral being of a width substantially equal to the diameter of said rope passage so as to permit the lateral introduction of a portion of rope into said rope-passage, substantially as set forth.

3. A rope-hitch comprising two spirals and a plate rigidly connecting said spirals, said spirals constituting rope-sleeves having free interior passages $b$ above one face of said plate, substantially as set forth.

4. A rope-hitch comprising two spirals having longitudinal rope-passages out of direct line with each other, and a bent plate rigidly connecting said spirals, substantially as set forth.

5. A rope-hitch comprising a plate A, having one face $a$ bent outwardly between its ends and concave, in cross section and having at each end a spiral formed integrally therewith, each spiral constituting a rope-socket extending beyond the end of plate A and having a free longitudinal passage $b$ just above the plane of said face $a$ of the plate, substantially as set forth.

In testimony whereof I affix my signature in presence of two witnesses.

EDWARD F. PARKER.

Witnesses:
F. E. McFADDEN,
CHARLES ROWELL.